Nov. 23, 1926.
L. SAIVES
1,607,919
SELF PROPELLED VEHICLE
Filed April 1, 1924
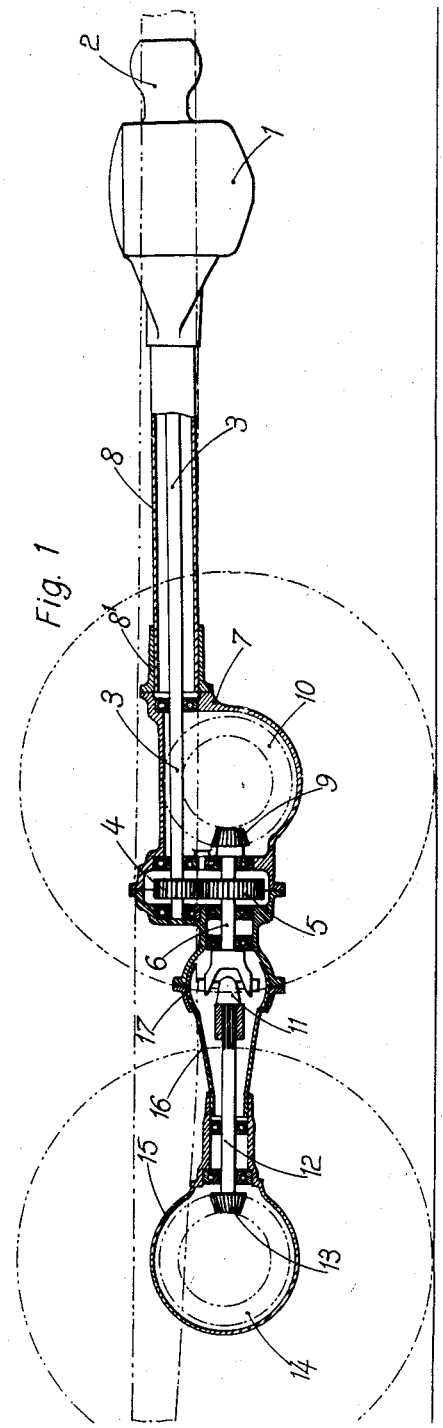
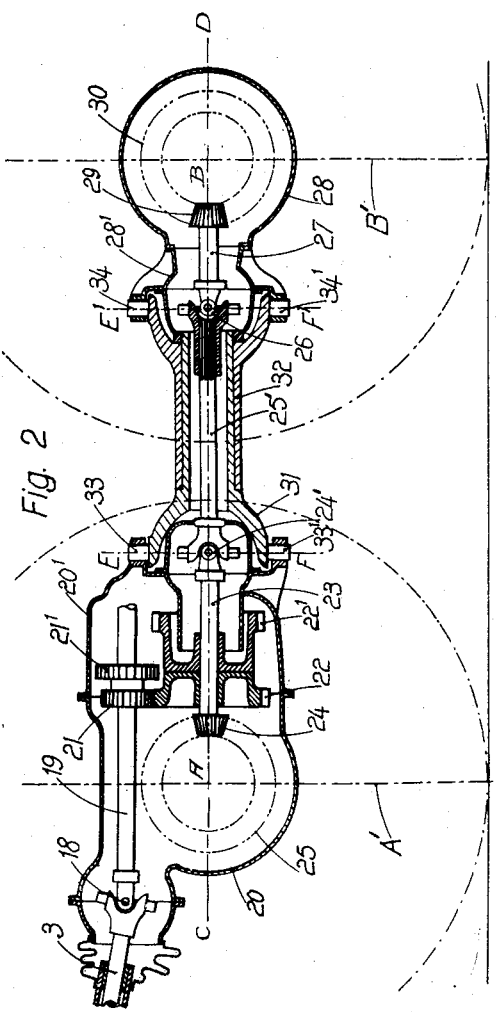
INVENTOR
Léon Saives.
By O'Neill and Bunn
ATTORNEYS.

Patented Nov. 23, 1926.

1,607,919

UNITED STATES PATENT OFFICE.

LÉON SAIVES, OF BILLANCOURT, FRANCE, ASSIGNOR TO LOUIS RENAULT, OF BILLANCOURT, FRANCE.

SELF-PROPELLED VEHICLE.

Application filed April 1, 1924, Serial No. 703,387, and in France May 24, 1923.

This invention relates to self propelled vehicles and more particularly to those which are provided with two back driving axles, such as lorries where almost all the load comes on the back part. In these vehicles, the normal speed of which is less than in the case of touring cars, it is necessary to provide a greater speed reduction between the engine and the driving wheels.

The arrangement, which is the subject of the invention, allows of the members of touring underframes being used for driving the rear wheels of a vehicle having several driving axles, whilst at the same time it provides a supplementary speed reduction adjacent to the set of axles, which makes it possible to use the change speed gear of touring cars without any modification.

It is also possible to locate a double reduction device between the two axles. This device receives motion from the change-speed gear box and transmits it to two axles which are connected by a shaft provided with a Cardan joint. The invention further comprises the addition of a special device intended to join up the two driving axles.

On the attached drawing, the Figures 1 and 2 show two arrangements in accordance with the invention, Fig. 1 showing a single reduction device, and Fig. 2 a double reduction device permitting doubling the number of speeds available.

On referring to the Figure 1, it is seen that the change-speed gear box is connected to the underframe of the vehicle by a ball and socket joint 2 and receives motion from the engine through a clutch not shown in the drawing. A shaft 3 coming from the change-speed gear transmits motion to a pinion 4 driving a pinion 5 integral with the shaft 6 rotating at reduced speed. The pinions 4, 5 and the shafts 3, 6 are enclosed in a casing 7 on the front driving axle and shift with it.

A tube 8 connected on the one hand by means of a sleeve 8′ with the casing 7 and on the other with the change-speed gear box 1 acts as stay.

It is quite evident that the box 1 might be fixed to the underframe; in which case the ball and socket joint would be located on the tube 8 where it issues from the box 1.

The shaft 6 carries at its front end a bevel pinion 9 gearing with the wheel 10 integral with the differential of the front driving axle, its rear end carries a Cardan joint 11 driving a shaft 12 which carries a bevel pinion 13 gearing with the wheel 14 integral with the differential of the back driving axle.

The casing of the back axle 15 is connected rigidly with a tube 16 constituting a stay articulated at its front end to the casing 7 of the front axle, by means of the ball and socket member 17.

The reduction pinions 4, 5 transmit motion to the shafts 6, 12 carrying the pinions 9, 13. The driving torque is shared between the two pinions 9, 13 and, as each axle has less torque to transmit, it may be of small dimensions.

By means of this arrangement, it is possible to equip a lorry having four back driving wheels by using one change-speed gear box and the differentials, shafts and wheels of touring cars, the necessary reduction of speed being obtained in this case by means of the reduction member described or by any other system of reduction.

The axles are connected to the underframe by springs fitted in a suitable manner.

In Figure 2, the transmitting shaft is shown at 3 coming from the change-speed gear box of the vehicle, the axes of the back driving axles A and B being shown by the lines A′, B′.

The shaft 3 drives, through the Cardan joint 18, the shaft 19, carried in bearings, not shown in the drawing, but integral with the casing 20 and with the axle A. Motion is transmitted by the pinion 21, integral with the shaft 19, to the pinion 22 rigid with the shaft 23, which has at one end a pinion 24, gearing with the crown wheel 25. This latter drives the wheel shafts of the axle A through a differential.

At its other end the shaft 23, carried in bearings integral with the casing 20 but not shown on the drawing, transmits motion by means of a Cardan joint 24′ to a shaft 25′ connected to the Cardan joint 26. Motion is transmitted to the shaft 27, rotating in bearings (not shown) integral with the casing 28. This shaft 27 has at its end a pinion 29, gearing with a crown wheel 30, which drives the wheel shafts of the axle B through a differential.

The two axles A and B are connected by means of two members 31—32, capable of rotation upon each other about the axis C D, for the purpose of permitting relative displacements of said axles with respect to each other about this axis C D.

On the other hand the members 31—32 are provided with pivots 33, 33' and 34, 34' articulated in the casings 20', 28' which are rigid with the axles A and B, thus permitting these axles to be displaced angularly in plan, one with respect to the other by rotating about the axes E F and E' F'.

The axles A and B can thus be displaced in all directions with respect to each other.

The arrangement shown in Figure 1 was made for a reduction in front of the transmission of motion to the axles. According to the Figure 2, this reduction is double. In fact the pinion 21 can slide on the shaft 19 and by means of the teeth 21' be brought to drive the shaft 23 through the teeth 22' of the pinion keyed on this shaft.

This arrangement consequently affords the advantage of doubling the number of speeds of the vehicle.

It is to be clearly understood that details of construction may be altered according to the needs of the case, the arrangement being shown entirely diagrammatic.

Claims:

1. In a four wheel drive for motor vehicles including parallel axles each containing drive mechanism including a differential, a drive shaft, a driven shaft, reduction gearing connecting the two, means for changing the ratio of the reduction gearing, gearing operated by the driven shaft to drive one set of drive wheels, a supplemental shaft, gearing operated by said supplemental shaft to drive the second set of drive wheels, and a Cardan joint operatively connecting the driven shaft to the supplemental shaft.

2. In a structure as defined in claim 1, means for connecting the two axles comprising two hollow telescopically arranged members enclosing the Cardan shaft, each member pivoted in an axle casing in the axis of the Cardan shaft, and rotatable on each other, thus permitting displacement of the two axles in all directions.

In testimony whereof I affix my signature.

LÉON SAIVES.